United States Patent [19]

Erkfritz

[11] 4,341,493
[45] Jul. 27, 1982

[54] ADJUSTABLE CLAMPING WEDGE SYSTEM FOR CUTTING INSERT OF A MILLING CUTTER

[75] Inventor: Donald S. Erkfritz, Clarkston, Mich.

[73] Assignee: General Electric Company, Detroit, Mich.

[21] Appl. No.: 137,995

[22] Filed: Apr. 7, 1980

[51] Int. Cl.³ .............................................. B26D 1/12
[52] U.S. Cl. ..................................... 407/36; 407/41; 407/49
[58] Field of Search ..................................... 407/36-39, 407/41, 48, 49, 103, 108

[56] References Cited

U.S. PATENT DOCUMENTS

| | | | |
|---|---|---|---|
| 2,385,750 | 9/1945 | Weddell | 407/41 |
| 2,751,663 | 6/1956 | Leuzinger | 407/41 |
| 3,408,722 | 11/1968 | Berry | 407/49 |
| 3,953,915 | 5/1976 | Fawcett et al. | 407/49 |
| 4,078,868 | 3/1978 | Erkfritz | 407/41 |

Primary Examiner—Leonidas Vlachos
Attorney, Agent, or Firm—Hedman, Casella, Gibson & Costigan

[57] ABSTRACT

A milling cutter includes an array of pockets each having radially extending side walls and a base wall from which radially projects an elongated locating rail. A safety wedge has one surface in engagement with one wall of the pocket and its opposed surface in engagement with one surface of a cutting insert. The latter includes a central hole through which extends a projection extending from the safety wedge. One edge of the cutting insert engages the locating rail, while the opposite surface of the cutting insert is engaged by a wedge surface of a wedge assembly which is connected to the body of the cutting tool, and is selectively operable for shifting of the wedge assembly into wedging engagement with the cutting insert. By this arrangement, the cutting insert is clamped intermediate the safety wedge and the wedge assembly, and the edge of the cutting insert bears against the locating rail. As the milling cutter is rotated, the hard wedge assembly is behind the cutting insert and thus provides protection to the cutter body in the event of a wreck that would destroy the carbide cutting edge of the cutting insert. In addition, the hard safety wedge disposed ahead of the cutting edge protects the body from chip-erosion.

10 Claims, 4 Drawing Figures

ADJUSTABLE CLAMPING WEDGE SYSTEM FOR CUTTING INSERT OF A MILLING CUTTER

This invention relates to a milling cutting tool having a main body portion which is formed with an array of pockets, each of which is adapted to receive a carbide tip cutting insert. Each pocket is defined by at least two angularly related walls, with an elongated locating rail projecting radially outwardly from one wall and adapted to engage the edge of the cutting insert. The latter is clamped between a safety wedge and a wedge assembly, and this arrangement protects the body of the milling cutter from chip-erosion and damage during high speed cutting operations.

BACKGROUND OF THE INVENTION

The present invention provides a new and improved cutting tool having unique means which insure that a cutting insert will be securely clamped within a pocket in the body of the cutting tool in such manner as to facilitate setting up or assembly of the cutting tool, while at the same time offering improved protection for the body of the cutting tool against damage brought about by chip-erosion or a wreck that would destroy the cutting edge of the cutting insert.

Various systems have been designed for clamping a cutting insert in a pocket formed in a cutter body. As an example, reference is made to U.S. Pat. No. 4,078,868 which issued on Mar. 14, 1978 to Donald S. Erkfritz and is entitled "Cutter Having Insects Clamped With Wedges." In the disclosure of U.S. Pat. No. 4,078,868 each pocket formed in the cutter body is of a construction including a substantially circumferentially facing side wall, and a bottom wall which faces in the radial direction and defines a substantial V-shaped seat. The cutting insert bears directly against the side wall of the body, with the innermost or inactive peripheral edge portion bearing against the V-shaped seat. The insert is clamped in the pocket by an arrangement of two wedges, a first internal wedge having a projection which extends through a central opening in the cutting insert, and a second wedge which bears directly against the first wedge and is connected to the cutter body by screw means. Tightening of the latter causes the first and second wedges to clamp the cutting insert directly against the side wall of the cutter body. Accordingly, in the prior art system as disclosed in U.S. Pat. No. 4,078,868, the second wedge directly co-acts with the first wedge (containing the integral projection), and the cutting insert bears directly against the side wall of the cutter body. In the operation of the milling cutter of U.S. Pat. No. 4,078,868, should a minor wreck occur which would destroy the carbide cutting edge of the cutting insert, the destruction of the cutting insert could result in damage to the main body of the milling cutter since the insert cutter is contiguous with the side wall of the cutter body. Of course, damage to a portion of the cutter body may render the entire body incapable of use, and hence worthless. Accordingly, it would be of significant advantage to provide a clamping system for a cutting insert in a milling cutter which offers improved protection for the main body of the milling cutter in the event of a wreck that would destroy the carbide cutting edge of the milling insert and, in addition, provides protection for the main body from chip-erosion, and such an advantage is an object of the present invention. Still further, it is an object of the invention to provide improved protection for the cutter body both immediately ahead of and immediately behind the cutter insert during rotation of the cutting tool.

SUMMARY OF THE INVENTION

According to the present invention there is provided a cutting tool having a generally cylindrical body adapted to be rotated about its primary axis, and having an array of pockets formed in the periphery thereof. Each pocket includes first and second angularly related walls, with the second angularly related wall facing substantially radially outwardly and including an elongated locating rail projecting radially outwardly therefrom. A cutting insert is disposed in the pocket and has one edge abutting the locating rail, and with the cutting insert being disposed between a safety wedge and a wedge assembly. A wedge surface of the safety wedge is in engagement with the first angularly related wall of the pocket and includes a projection which extends through a central hole in the cutting insert. The wedge assembly has a wedge surface for engaging the opposed face of the cutting insert, and a screw is provided in the wedge assembly for selectively shifting the wedge assembly into engagement with the body of the cutting tool. By this arrangement, the cutting insert is clamped intermediate the safety wedge and the wedge assembly and an edge of the cutting insert abuts the locating rail in the pocket. As the cutter tool is rotated at high speeds and the cutting insert engages the workpiece to be milled, metallic chips which are cut from the workpiece accumulate ahead of the cutting insert in the region of the wedge assembly. The hard wedge body portion of the wedge assembly prevents chip-erosion of the main body of the cutting tool. At the same time, a safety wedge protects the main body from damage in the event of a wreck that would destroy the carbide cutting edge of the cutting insert.

DESCRIPTION OF THE PREFERRED EMBODIMENT

Figure 2:
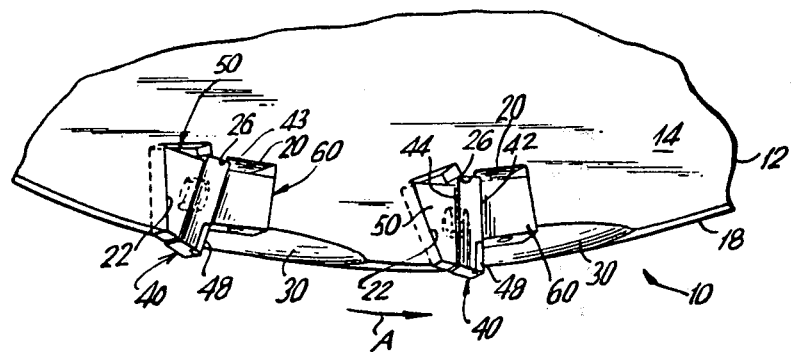
FIG. 2 is a partial plan view of a milling cutter including the new and improved system for clamping a cutting insert in accordance with the subject invention.
Figure 3:
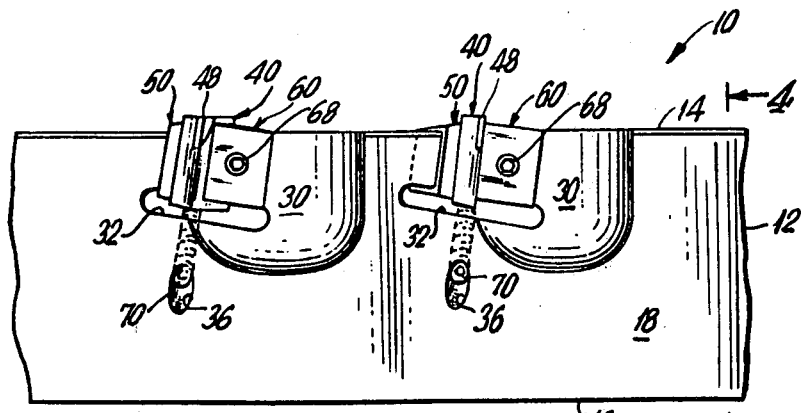
FIG. 3 is a partial side elevational view of the milling cutter of FIG. 2.
Figure 4:
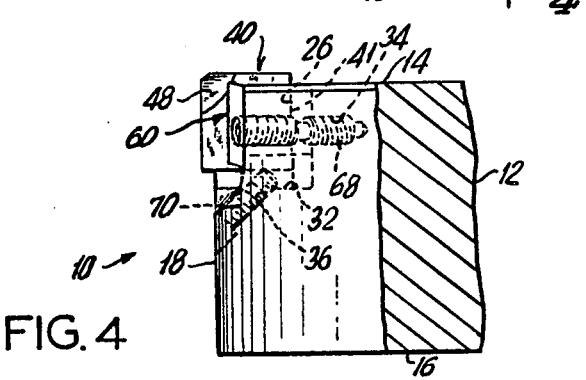
FIG. 4 is a cross-sectional view of the clamping system of the subject invention taken along line 4—4 in FIG. 3.

Turning to FIGS. 2, 3, and 4, the milling cutter tool of the subject invention is generally designated by the numeral 10 and basically comprises a body 12 including planar surfaces 14 and 16, and an annular side wall 18. Body 12 is adapted to be rotated in a counterclockwise direction (arrow A) about a predetermined axis defined by the axis of a central hole (not shown) formed through the body. A rotatably driven spindle (not shown) engages the central hole in the body 12 for rotating the milling cutter tool 10. Uniformly disposed about the periphery of the body 12 is an array of pockets 20 which are equally spaced in order to maintain the dynamic balance of the milling cutter 10. Disposed in each pocket 20 is a cutting insert mounting system of the subject invention.

Figure 1:
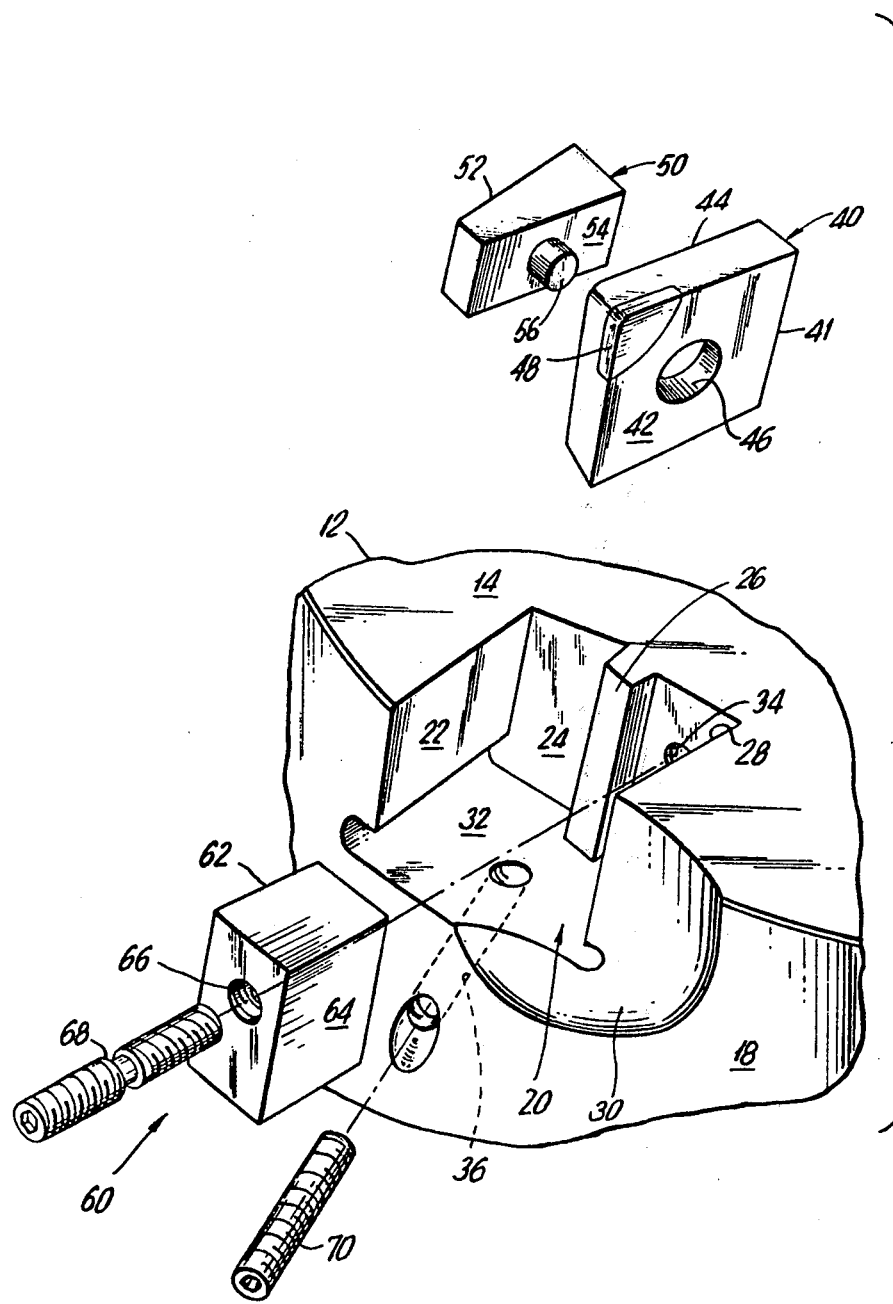
FIG. 1 is an exploded, perspective view of the components of the clamping system of the subject invention.

As more particularly illustrated in the exploded view of FIG. 1, a pocket 20 formed in the periphery of the body 12 includes a substantially circumferentially facing trailing wall 22 which is disposed at an angle to a substantially radially facing bottom wall 24. The latter includes an intermediate, elongated locating rail 26 which projects radially outwardly from the bottom wall 24. Pocket 20 is further defined by a substantially circumferentially facing leading wall 28 and a chip recess 30 leading to a base wall 32. A threaded aperture 34 is provided in the body 12 and extends through the bottom wall 24, while an angled threaded hole 36 (see FIG. 4) extends through the body 12 leading from the circumferential annular wall 18 of the body and into the pocket 20 through the base wall 32.

The cutting insert mounting system basically comprises a cutting insert 40, a safety wedge 50, and a wedge assembly 60. The cutting insert 40 is of conventional construction and is generally planar, having a rectangular configuration with a leading edge surface 42 and a trailing edge surface, designated by the numeral 44. A central hole 46 extends through the cutting insert between the surfaces 42 and 44, and a carbide tip 48 is suitably bonded to a corner of the cutting insert in the plane of the leading edge surface 42, and opposite the edge 41 of the insert 40.

Safety wedge 50 includes a wedge surface 52 which in the assembled condition of the cutting insert mounting system (see FIG. 2) is contiguous to and abuts the trailing wall 22 of the pocket 20. Extending from the opposite surface 54 of the safety wedge 50 is a projection 56 which is of circular cross-section and is adapted to extend into the central hole 46 in the cutting insert 40. Preferably, the diameter of the cylindrical projection 56 is significantly less than the diameter of the central hole 46 whereby in the assembled condition of the mounting system a line contact is established between the projection 56 and the cutting insert 40. The safety wedge is preferably made of a high density material which is harder than the body 12.

Wedge assembly 60 is also made of a high density material and includes opposed wedge surfaces 62 and 64, with an aperture 66 extending therebetween and adapted to accommodate a wedge lockscrew 68. The latter is threadably received in the aperture 66 as well as the threaded aperture 34 in the body 12 of the cutter tool 10.

Referring to FIGS. 1 and 4, an adjustment screw 70 extends through the threaded aperture 36 in the body 12 and may be positioned so as to project into the pocket 20, thereby limiting the overhang of the cutting insert relative to the planar surface 14 of the body 12.

Referring to FIGS. 2 and 4, in the assembly of the cutting insert mounting assembly of the subject invention, the cylindrical projection 56 of the safety wedge 50 is inserted into the central hole 46 in the cutting insert 40, after which the sub-assembly is positioned into a pocket 20 such that the edge 41 of the cutting insert opposed to the carbide tip 48 abuts against the elongated locating rail 26. Next, the wedge assembly 60 is inserted intermediate the leading edge surface 42 of the cutting insert and the leading wall surface 28 of the pocket, and the screw 68 is adjusted and is selectively operable to shift the wedge assembly 60 into the body and in wedging engagement with the cutting insert 40. As the wedge lockscrew 68 is tightened, the wedge assembly 60 clamps the cutting insert 40 against the safety wedge 50 until such time as the edge 41 of the cutting insert 40 abuts the locating rail 26, and the cutting insert is fully clamped and seated intermediate the safety wedge 50 and the wedge assembly 60. Accordingly, at such time, the cutting insert 40 is not in direct contact with either the circumferentially facing trailing wall 22 or the circumferentially facing leading wall 28 of the pocket 20. This is of particular importance with respect to protecting the main body 12 of the milling cutter tool 10 against possible damage occurring during high speed operation of the milling cutter tool 10. More particularly, as the cutter tool 10 is rotated in the counterclockwise directon A, and engages the workpiece to be milled, metallic chips which are cut from the workpiece accumulate ahead of the carbide tip 48 and the surface 42 of the cutting insert 40 in the region of the wedge assembly 60. Since the wedge assembly 60 includes the hard wedge body portion 62, it is less susceptible to chip erosion then the main body 12 of the cutter tool 10. Thus, the hard wedge body 62 of the wedge assembly 60 effectively prevents chip erosion of the main body 12 ahead of the cutting insert.

At the same time, during high speed operation of the milling cutter tool, in the event that the carbide cutting tip 48 of the cutting insert 40 is damaged or destroyed, as in the case of what is commonly referred to as a "wreck," the resulting damaged pieces which are forced downstream of or behind the cutting insert 40 contact the hard body of the safety wedge 50, rather than engaging the main body 12 of the cutter tool 10. Accordingly, the safety wedge effectively provides protection to the body 12 in the event of a "wreck."

It is noted that during the assembly of the subject cutting insert mounting system, as the wedge assembly 60 is shifted radially inwardly into engagement with the cutting insert, the wedging forces are transmitted through the cutting insert 40 to the safety wedge 50, and by virtue of the wedge surface 52 bearing against the circumferentially facing trailing wall 22, the safety wedge draws the cutting insert 40 downwardly against the radial, elongated locating rail 26. More particularly, the projection 56 of the safety wedge contacts the radially inner circumference of the central hole 46 for fully seating the edge 41 of the cutting insert 40 against the elongated locating rail 26. As shown in FIG. 2, the width of the cutting insert 40 may be greater than the width of the locating rail 26, and in the final clamped position of the mounting system, the edge 41 of the insert directly bears against the elongated locating rail 26 and is disposed intermediate the safety wedge 50 and the wedge assembly 60. Preferably the locating rail is generally rectangular in cross-section, as shown in FIGS. 1 and 2.

While the invention has been described with reference to a specific embodiment, it is obvious that there may be variations which properly fall within the scope of the invention. Accordingly, the invention should be limited in scope only as may be necessitated by the scope of the appended claims.

I claim:

1. A milling cutter including a cylindrical body having a substantially planar base surface and an annular side surface extending perpendicularly from the base surface, said body being rotatable about a predetermined axis and having an array of pockets disposed there about; each said pocket opening out of the annular side and planar base surfaces of said body, each pocket including a base wall substantially parallel to said planar base surface, a substantially circumferentially facing trailing wall, a leading wall and a substantially radially facing bottom, said bottom including an elongated locating rail extending parallel to the predetermined axis and projecting radially outwardly from said bottom, each said pocket further including:

a generally planar cutting insert including a hole extending through the planar surface thereof, with one edge of said insert being in engagement with said locating rail, a safety wedge having one surface disposed in engagement with one face of said insert and having an opposed surface defining a planar wedge surface which diverges away from said cutting insert upon progressing inwardly, said opposed surface being in engagement with said circumferentially facing trailing wall, a projection rigid with said one surface of the safety wedge and projecting into said hole in the cutting insert, a wedge assembly having a wedge surface in engagement with the opposite face of said cutting insert and a substantially radially extending locking screw threadably connected between said wedge assembly and said body said locking screw being selectively operable to shift said wedge assembly into wedging engagement with said cutting insert and said leading wall for clamping said cutting insert against said locating rail and intermediate said safety wedge and wedge assembly, and an adjustable screw threadably connected to the cutter body and extending from said annular side surface of said body to said base wall of said pocket, said adjustable screw being in engagement with a second edge of the cutting insert, said adjustable screw for altering the position of the cutting insert in a direction within the plane of said cutting insert.

2. A milling cutter as in claim 1 wherein said elongated locating rail is generally rectangular in cross-section.

3. A milling cutter as in claim 1 in which said hole and said projection are of circular cross-section, the diameter of said projection being substantially less than the diameter of said hole.

4. A milling cutter as in claim 1 in which the width of each elongated locating rail is less than the thickness of the associated cutting insert.

5. A cutting tool having a cylindrical body, with a substantially planar base surface and an annular side surface extending perpendicularly from the base surface, said body being adapted to be rotated about a predetermined axis, said body having a pocket formed therein, said pocket having first and second angularly related walls, a base wall parallel to said base surface, a leading wall with said second angularly related wall including an elongated locating rail projecting radially outward therefrom, said pocket further including:

a cutting insert disposed in said pocket and including a hole extending therethrough, a safety wedge having one surface disposed in engagement with one surface of said insert and having an opposed planar surface disposed in engagement with said first wall, said safety wedge including a projection extending through said hole in said cutting insert, a wedge assembly having a wedge surface for engagement with the opposed face of said cutting insert and a substantially radially extending locking screw threadably connected between said body and said wedge assembly, said locking screw being selectively operable to shift said wedge assembly into wedging engagement with said cutting insert and said leading wall whereby said cutting insert is clamped intermediate said safety wedge and said wedge assembly with the edge of said cutting insert abutting said locating rail such that the respective wedge assemblies on opposite sides of said cutting insert protect the body of the milling cutter from chip-erosion and damage, and an adjustable screw threadably connected to the cutter body and extending from said annular side surface of said body to said base wall of said pocket, said adjustable screw being in engagement with a second edge of the cutting insert, said adjustable screw for altering the position of the cuting insert in a direction within the plane of said cutting insert.

6. A cutting tool as in claim 5 wherein an array of pockets are provided about the periphery of said cutter body, and with a cutting insert, safety wedge, and wedge assembly being provided in each said pocket.

7. A cutting tool as in claim 5 wherein said elongated locating rail is generally rectangular in cross-section.

8. A cutting tool as in claim 5 wherein the width of said elongated locating rail is less than the width of said cutting insert.

9. A cutting tool as in claim 5 wherein the surface of said safety wedge disposed in engagement with the first wall of the pocket defines a wedge surface which diverges away from said cutting insert upon progressing inwardly.

10. A cutting tool as in claim 5 wherein said hole and said projection are of circular cross-section, with the diameter of said projection being less than the diameter of such hole.

* * * * *